March 9, 1948.                 A. G. NICKLE                    2,437,305
              RETAINING MEANS FOR SETSCREWS IN BEARING INNER-RACES
                            Filed Sept. 7, 1944

INVENTOR.
BY Arthur G. Nickle
Frank C. Fearmon
ATTORNEY.

Patented Mar. 9, 1948

2,437,305

UNITED STATES PATENT OFFICE 2,437,305

RETAINING MEANS FOR SETSCREWS IN BEARING INNER RACES

Arthur G. Nickle, Saginaw, Mich.

Application September 7, 1944, Serial No. 553,099

7 Claims. (Cl. 287—52.08)

This invention relates to means for securing the inner race of an anti-friction bearing to a shaft, and more specifically to retaining means that will positively prevent the inner-race setscrews from loosening.

The usual practice is to secure the inner race of an anti-friction bearing to the shaft by means of a pair of radially disposed setscrews, which resist both axial and rotative movement of the shaft with respect to the inner race. Due to vibration and shocks, these setscrews tend to loosen and back out, thereby freeing the inner race and endangering the operation of the machine. When this happens, the rotation of the shaft in the inner race quickly wears both shaft and inner race, thereby detroying the metal-to-metal fit. When axial movement of the shaft takes place with respect to the inner race, the working parts of the machine may become inoperative. Further, the loosened setscrews have been known to fall out and become entangled in the moving parts of the machine, such as gears operating in an oil-tight closure, thereby causing extensive damage.

To prevent the inner-race setscrews from loosening, the inexperienced mechanic sometimes tightens them to the extent that the inner race is distorted. Such distortion leads to a premature bearing failure. Therefore, it becomes the object of this invention to provide a simple and effective retainer means that will positively prevent the inner-race setscrews from loosening.

Figure 1:
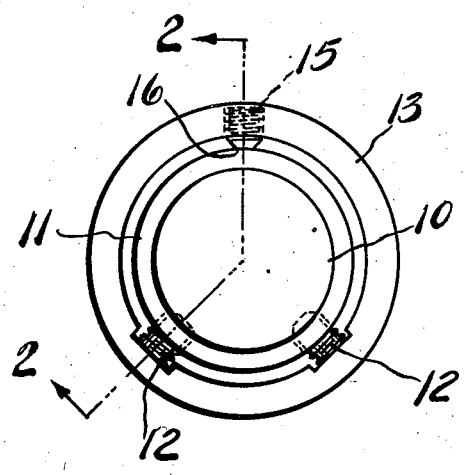
Fig. 1 is an end view of my inner-race setscrew-retaining means assembled in working relation with a ball bearing inner-race that is mounted on a shaft.
Figure 2:
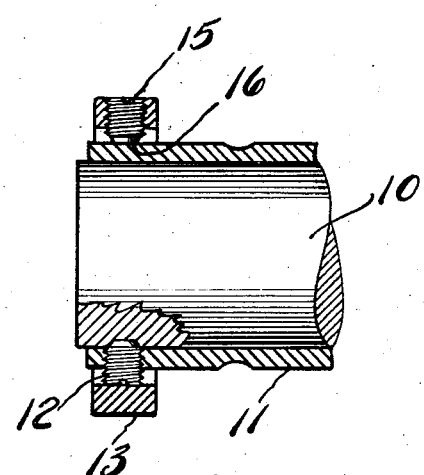
Fig. 2 is a fragmentary part-sectional view taken on the line 2—2 of Fig. 1.

Referring to the drawing, the numeral 10 indicates a shaft on which is mounted an inner race 11 for a ball bearing (not shown), the race being secured to the shaft by means of circumferentially spaced setscrews 12 that project a short distance beyond the periphery of the race, so as to contact the setscrew-retainer collar 13 when it is assembled in working relation as shown in Fig. 1.

The retainer collar 13 is preferably formed with a pair of shallow, internal slots 14 that are circumferentially spaced to register with the projecting heads of the setscrews 12 in the inner race, thereby providing a convenient means for locating the collar.

Figure 3:
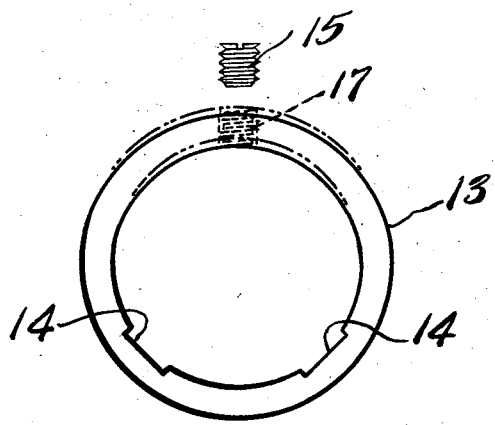
Fig. 3 is an end view of the retaining means, including the setscrew therefor, the original shape of the retainer collar being shown in solid lines, while the broken lines indicate the deformation that takes place when the collar is assembled on an inner race and locked thereto.

As shown in Fig. 3, the collar 13 is preferably manufactured slightly out of round, as indicated by the solid lines, so that when it is assembled over the inner-race setscrews and stressed by tightening the setscrew 15 against the inner race at 16, the collar assumes an elastic shape that approximates a circle, as shown by the broken lines. When so stressed, the inner-race setscrews are securely held so that they cannot turn or back out.

The point of maximum bending movement on the collar is at 17 on the centerline of the setscrew hole. As this is also the weakest point in the collar, it will be apparent that, when the collar is stressed by tightening the setscrew 15, the deformation will be a maximum at this point. Such deformation distorts the internal threads at 17, so they no longer truly register or mate with the external threads on the setscrew. This thread distortion pinches or binds the setscrew so that it turns hard, thereby providing a novel and effective means for securing the setscrew so that it cannot be loosened by vibration or shock while the elastic collar remains stressed.

The foregoing description applies to an inner race having a pair of setscrews that bear against the shaft. If only one setscrew were used, this would not be departing from the spirit of my invention.

What I claim is:

1. The combination that includes a shaft having the inner race of an anti-friction bearing mounted thereon, circumferentially spaced setscrews for securing the race to the shaft with the heads projecting beyond the outer periphery thereof, a collar assembled over said race, and means for drawing the collar into engagement with the heads of the setscrews, and securing said collar in position on said race.

2. The combination as defined in claim 1 in which shallow slots, concentrically spaced to register with the projecting heads of the setscrews, are provided on the interior surface of the collar.

3. The combination that includes the inner race of an anti-friction bearing mounted on a shaft and setscrewed thereto with a pair of setscrews that project beyond the periphery of the inner race, a loose-fitting inherently resilient retainer collar assembled over the inner race and in engagement with the heads of the inner-race setscrews, and means for stressing the collar to react radially against the inner race setscrews, the said means comprising a setscrew in the collar that bears against the inner race.

4. The combination as defined in claim 3 in which the collar setscrew is locked against loosening by the distortion of the threads in the collar, the said thread distortion being the result of stress deformation in the collar when the collar setscrew is tightened.

5. The combination that includes a shaft having the inner race of an anti-friction bearing mounted thereon and secured thereto by means of a pair of circumferentially-spaced setscrews, a loose-fitting collar assembled over the inner race and in contact with the heads of the inner-race setscrews, and means for drawing the said collar into engagement with the inner-race setscrews, said means comprising a collar setscrew that reacts against the inner race.

6. In combination, a shaft, an anti-friction bearing inner race mounted on the shaft, a setscrew in the inner race for locking it to the shaft, means for preventing the inner-race setscrew from backing out, said means including a collar that surrounds the inner race, and means for locking the collar to the inner race, the last said means comprising a setscrew.

7. The combination as set forth in claim 6 wherein the collar is loose-fitting with respect to the inner race, and subject to distortion when the collar setscrew is tightened.

ARTHUR G. NICKLE.

REFERENCES CITED

The following references are of record in the file of this patent:

UNITED STATES PATENTS

| Number | Name | Date |
|---|---|---|
| 827,135 | Wolfsager | July 31, 1906 |
| 1,289,887 | Otis | Dec. 31, 1918 |